United States Patent Office 3,374,116
Patented Mar. 19, 1968

3,374,116
PROCESS FOR REMOVING THIN FILMS
FROM VITREOUS SURFACES
Cecil R. Fetters, Toledo, Ohio, assignor to Libbey-Owens-Ford Glass Company, Toledo, Ohio, a corporation of Ohio
No Drawing. Filed Oct. 3, 1963, Ser. No. 313,438
6 Claims. (Cl. 134—2)

ABSTRACT OF THE DISCLOSURE

A method of removing thin, transparent, metal oxide films, from vitreous surfaces by exposing the filmed surfaces to the action of a solution of an organic reducing agent such as phenylhydrazine hydrochloride or oxalic acid at elevated temperatures, for a length of time sufficient to at least partially remove the film and then washing the solution from the surface.

This invention relates generally to the treatment of filmed or coated surfaces and, more particularly, relates to a novel method for either partially or completely removing metal oxide films from vitreous surfaces to which they have been applied.

Ultrathin transparent films of metal compounds, particularly the oxides and, to some extent, the fluorides, have recently come into rather wide use for a number of purposes ranging from electrical conductivity to light modification. In this connection, it may be mentioned that certain light modifying films have recently found an important place in both the automotive and architectural industries, where the use of large expanses of glass has often been found to result in considerable discomfort to persons within the structures due to the transmission of objectionable components of the sun's rays therethrough. In order to overcome these problems, it has been proposed to apply a film, for example, composed of cobalt oxide, a combination of cobalt oxide and nickel oxide, a combination of nickel oxide and manganese oxide, iron oxide, copper oxide, tin oxide, bismuth oxide, and other metal oxides or combinations of oxides, to the glass surfaces to reduce the transmission of such objectionable components of the sun's rays while at the same time preserving a substantial amount of visibility through the window.

However, there are instances where it is found, upon critical inspection of the window after the film has been applied thereto, that such film is not sufficiently perfect for commercial acceptance. In this event, removal of the film is desirable so that the expensive polished and often bent plate glass window need not be scrapped but may be reprocessed to produce a new lite with a satisfactory film. There are also instances where it is necessary or desirable to delete portions of thin films from selected areas only of a filmed or partially films substrate, or remove part of a film in order to reduce its thickness Various methods have heretofore been proposed for removing films from glass or other vitreous glazing closures, among which may be mentioned the use of strong mineral acids such as sulphuric, phosphoric or hydrochloric acids with metal salts frequently added as catalysts, but it has been found that these methods all suffer from one serious drawback, namely, they render the glass surface from which the film is removed unfit for reapplication of another film, for example, a metal oxide film.

It is therefore a principal object of the present invention to provide an improved process for either completely or partially removing an ultrathin film from its supporting base or substrate.

Another object of the invention is the provision of a method of removing metal compound films, for example, metal oxides, from vitreous surfaces.

More particularly, it is a further object of the invention to provide a method for removing thin, transparent metal oxide films from glass surfaces without damaging the surface of the glass during the removal process or otherwise rendering it unfit for refilming.

Other objects and advantages will in part be apparent and will in part appear hereinafter.

For a better understanding of the nature and objects of the invention, reference should be had to the following detailed description which is intended only to illustrate and disclose, but in no way limit, the invention.

Broadly stated, the novel process in accordance with the present invention comprises subjecting a surface, filmed with a metal compound, to a heated aqueous solution of an organic reducing agent. Generally, the temperature of the solution should be at least 125° F. and the concentration thereof at least 50 percent by weight reducing agent if film removal is to be effected in a reasonable and commercially acceptable time. Following contact of the hot solution with the filmed surface, the surface need be only washed with water to again be ready for further film spray operations. In this connection, while cold water may be used in the washing operation, water at a somewhat elevated temperature, e.g., 120° F. to 150° F. is preferred.

While various of the well known organic reducing agents may be employed in accordance with the invention, particularly good results have been obtained with the use of phenylhydrazine hydrochloride and oxalic acid. Aqueous solutions of these compounds, having concentrations of from about 50 to 95 weight percent and preferably from about 75 to 85 weight percent, have been found to effect film removal within a very satisfactory time and leave the substrate suitable for refilming.

While aqueous solutions of the above compounds are preferred, it will be appreciated that many of the other known organic reducing agents which may be employed in accordance with the invention are not soluble in water. Accordingly, alcohol solutions of these agents may be used in the novel film deletion process without producing any adverse effects on the glass or other vitreous substrates. In this respect, phenylhydrazine is a further example of an organic reducing agent which may be used in accordance with the invention and while it is water soluble to some extent, it is preferred to use alcohol as the solvent in order to obtain the desired concentration of this agent, i.e. from 50 to 95 weight percent.

The deletion rates of the solution in accordance with the invention are all temperature dependent. In this respect, solutions of organic reducing agents having temperatures in the range of from about 125° F. to 250° F. and preferably from about 212° F. to 235° F. have found to completely remove metal compound films from vitreous substrates when the latter are kept immersed in the solutions for from ½ to 10 minutes, depending upon the thickness of such films. Use of the higher temperatures results in somewhat faster deletion time with the only limitation on the upper temperature in essence being that at which the solutions will decompose or boil off.

It is to be understood that while the present invention is in no way limited to use with films of any specific metal compound, or to the removal of films from any specific supporting surface, it has been found particularly effective in removing metal oxide films such as cobalt oxide, nickel oxide, iron oxide and mixtures thereof from glass and, for purposes of illustration, will be specifically described in that connection here.

The following examples illustrate the best presently known mode for carrying out the instant invention.

Example I

A solution was prepared by dissolving 40 parts by weight of phenylhydrazine hydrochloride in 100 parts by weight of water (76.4 weight percent phenylhydrazine hydrochloride). The solution was then heated to a temperature of 212° F. and maintained at such temperature. A ¼ inch thick piece of regular plate glass 4 inches square in size and containing a cobalt oxide film having a light transmittance of 30 percent was immersed in the solution for 5 minutes. The plate glass piece was then removed from the solution, thoroughly washed with hot water at a temperature of about 130° F. to 140° F. and dried. Inspection and transmission tests on the treated glass sample showed the cobalt oxide film to be completely removed. The sample was next again placed in position for the reapplication of a cobalt oxide film. The sample was refilmed and inspected. The refilmed sample was, for all intents and purposes, satisfactory and of the same commercial quality as when originally filmed.

Example II

The same solution as described in Example I, i.e. 76.4 weight percent phenylhydrazine hydrochloride, was employed to remove various other films having differing light transmittance properties. This substrate in each instance was regular plate glass ¼ inch in thickness and 4 inches square. The temperature of the solution was maintained at 212° F. for each test. The following table illustrates the results obtained:

TABLE I

| Film | Light Transmittance of Sample (percent) | Time Sample was Immersed in Solution for Complete Removal of Film (mins.) |
| --- | --- | --- |
| Nickel Oxide-Mangenese Oxide | 30 | 5 |
| Iron Oxide | 40–42 | 3–5 |
| Cobalt Oxide-Nickel Oxide | 27 | 300 |
| Nickel Oxide | 60 | 10 |
| Cobalt Oxide | 29 | 5 |

Inspection of all of the samples after treatment indicated no change had taken place in the surface quality of the glass.

Example III

A series of aqueous solutions of oxalic acid were prepared and heated to and maintained at various temperatures between 100° F. to 230° F. A ¼ inch thick regular plate glass sheet 12 inches by 12 inches and containing a cobalt oxide film of 30 percent light transmittance was then immersed in each of the solutions and maintained therein for a number of minutes. The following table illustrates the effect of the above treatments on each of the samples:

TABLE II

| Temperature of Solution (° F.) | Concentration of Solution (parts by weight) Oxalic Acid | Concentration of Solution (parts by weight) Water | Weight Percent Oxalic Acid | Time for Operation (min.) | Effect |
| --- | --- | --- | --- | --- | --- |
| 100 | 20 | 10 | 93 | 5 | Very little change in film. |
| 150 | 20 | 10 | 93 | 5 | Partial removal of film. |
| 185 | 20 | 20 | 87.5 | 10 | Complete removal of film. |
| 222–230 | 20 | 10 | 93 | 5 | Do. |
| 222–230 | 20 | 10 | 93 | 2 | Do. |
| 222–230 | 20 | 20 | 87.5 | 3–5 | Do. |
| 222–230 | 10 | 20 | 78 | 5 | Do. |

Inspection of all of the plate glass samples after the above treatments indicated that no change had taken place in the surface quality thereof whereby the glass, after only a water wash and drying, was again ready for additional film spray operations.

Example IV

Another series of aqueous solutions of oxalic acid were prepared in order to demonstrate their use in removing various films other than cobalt oxide from vitreous substrates. The substrate in each instance was ¼ inch thick and 4 inches square. The solutions were maintained at a temperature in the range of 222° F. to 225° F. during immersion therein of the filmed substrate. The immersion times required for complete removal of the films from the substrate are set forth in the following table:

TABLE III

| Film | Glass | Light Transmittance of Sample (percent) | Weight Percent Oxalic Acid | Immersion Time |
| --- | --- | --- | --- | --- |
| Nickel Oxide-Manganese Oxide | Regular Plate | 30 | 87.5 | 1 min. |
| Iron Oxide | do | 45–50 | 87.5 | 3 mins. |
| Cobalt Oxide-Nickel Oxide | do | 27 | 87.5 | 20 mins. |
| Nickel Oxide | do | 60–62 | 87.5 | 5 mins. |
| Bismuth Oxide | do | 70–76 | 78 | 30 secs. |
| Tin Oxide | do | 80 | 78 | 4 mins. |
| Europium Oxide | do | 74 | 78 | 30 secs. |
| Samarium Oxide | do | 82 | 78 | 30 secs. |
| Nickel Oxide-Manganese Oxide | do | 40 | 78 | 1 min. |
| Cobalt Oxide-Iron Oxide | Neutral Gray, Heat Absorbing | 8 | 78 | 1–2 mins. |
| Cobalt Oxide-Lead Oxide | Regular Plate | 15 | 78 | 1–2 mins. |
| Cobalt Oxide-Manganese Oxide | do | 13 | 78 | 1–2 mins. |
| Cobalt Oxide-Nickel-Oxide-Manganese Oxide | do | 10 | 78 | 1 min. |
| Cobalt-Oxide-Nickel-Oxide-Iron Oxide | Heat Absorbing | 23 | 78 | 6 mins. |

Inspection of all of the samples after treatment indicated no change had taken place in the surface quality of the glass.

It will be appreciated that inasmuch as phenylhydrazine and other organic reducing agents have toxic properties, proper precaution should be taken that all operations are carried on in adequately ventilated areas in order that fumes may be readily removed. This is also true in the case of hot oxalic acid solutions whereby the surface area thereabove should be well ventilated.

The invention is applicable to the treatment of both tempered and untempered glass. Generally, the thermal shock encountered when treating tempered glass of room temperature will be harmless. However, when treating untempered glass, it may be necessary to heat the glass to about the temperature of the acid bath before immersion to avoid breakage.

The invention is applicable to the removal of films from vitreous surfaces in general, including for example, glass, quartz, porcelain and the like.

While the invention has been specifically described in its preferred embodiments as immersing the glass sheet either cold or heated in a film removing bath, it is to be included within the scope of the invention to heat the glass sheet to a suitable deletion temperature and apply the film removing solution to the sheet by spraying, brushing or the like.

It will be understood that this invention is susceptible to modification in order to adapt it to different usages and conditions and, accordingly, it is desired to comprehend such modifications within the scope of the appended claims.

I claim:

1. A process of at least partially removing a thin transparent metal oxide film from a vitreous surface comprising the steps of providing a bath of a solution consisting essentially of from 50 to 95 weight percent of an organic reducing agent selected from the group consisting of phenylhydrazine hydrochloride and oxalic acid in a solvent selected from the group consisting of alcohol and water, heating said bath to a temperature in the range of from about 125° to 250° F., and subjecting said filmed surface to said bath for from ½ to 10 minutes to remove said film.

2. A process as defined in claim 1 in which said organic reducing agent is phenylhydrazine hydrochloride and said solvent is alcohol.

3. A process as defined in claim 1 in which said organic reducing agent is oxalic acid and said solvent is water.

4. A process for removing a thin transparent metal oxide film from a vitreous surface comprising the steps of providing a bath consisting of an aqueous solution consisting essentially of from 50 to 95 weight percent of an organic reducing agent selected from the group consisting of phenylhydrazine hydrochloride and oxalic acid, heating said bath to a temperature in the range of from about 125° to 250° F., subjecting said filmed surface to said bath from ½ to 10 minutes to remove said film, and washing the solution from said vitreous surface.

5. A process as defined in claim 4, wherein the bath is heated to a temperature in the range of from about 212° F. to 235° F.

6. A process as defined in claim 4, wherein the solution comprises from 75 to 85 weight percent organic reducing agent.

References Cited

UNITED STATES PATENTS

| | | |
|---|---|---|
| 145,971 | 12/1873 | Sawyer _____ 134—42 X |
| 2,326,837 | 8/1943 | Coleman _____ 134—27 |
| 2,557,983 | 6/1951 | Linder. |
| 2,606,566 | 8/1952 | Tarnopol _____ 134—4 |
| 2,617,742 | 11/1952 | Olson. |
| 2,631,950 | 3/1953 | Rosenfeld et al. _____ 134—3 |
| 2,810,665 | 10/1957 | Szayna _____ 134—22 X |
| 3,085,915 | 4/1963 | Heitmann et al. _____ 134—22 |
| 3,186,870 | 6/1965 | Mentzer _____ 134—3 |

MORRIS O. WOLK, *Primary Examiner.*

J. ZATARGA, *Assistant Examiner.*

UNITED STATES PATENT OFFICE

CERTIFICATE OF CORRECTION

Patent No. 3,374,116                          March 19, 1968

Cecil R. Fetters

It is certified that error appears in the above identified patent and that said Letters Patent are hereby corrected as shown below:

Column 3, TABLE I, third column, line 3 thereof, for "300" read -- 3 --; column 5, line 31, strike out "or".

Signed and sealed this 1st day of July 1969.

(SEAL)
Attest:

Edward M. Fletcher, Jr.                     WILLIAM E. SCHUYLER, JR.
Attesting Officer                               Commissioner of Patents